United States Patent

[11] 3,585,310

[72] Inventor Klaus Gueldenpfennig
Rochester, N.Y.
[21] Appl. No. 785,896
[22] Filed Dec. 23, 1968
[45] Patented June 15, 1971
[73] Assignee Stromberg-Carlson Corporation

[54] TELEPHONE SWITCHING SYSTEM
16 Claims, 4 Drawing Figs.

[52] U.S. Cl. .......... 179/18
[51] Int. Cl. .......... H04q 3/42
[50] Field of Search .......... 179/18.74, 18.24

*Primary Examiner*—William C. Cooper
*Attorney*—Charles C. Krawczyb

ABSTRACT: A telephone switching system is described which has at least one cross-point matrix strip for each link. The matrix strip includes a group of cross-point switches each of which is associated with a different line and any of which can be connected to the link. The cross-point switches which are operated are selected by means of counters which also provide link memory. The counters for the selected links are advanced to counts corresponding to a desired line. The selected cross-point switch is operated by transferring the count in the counter to the matrix strips. The matrix strip are arranged in groups such that the lines can be connected to selected links by selected control of the counters.

INVENTOR.
KLAUS GUELDENPFENNIG

BY

ATTORNEY

INVENTOR.
KLAUS GUELDENPFENNIG
BY
M. Lukacher
ATTORNEY

INVENTOR.
KLAUS GUELDENPFENNIG

BY

ATTORNEY

TELEPHONE SWITCHING SYSTEM

The present invention relates to electronic switching systems and particularly to an electronic control system for switching systems using arrays of cross-point matrices.

The invention is especially suitable for use in telephone switching systems for establishing transmission paths between line circuits, which may in turn be connected to the telephone sets of subscribers, and selected trunks, junctors or other line circuits. The invention, however, is generally applicable for establishing connecting links between inputs and outputs for purposes of communication or signalling between selected pairs of inputs and outputs.

In some matrix switching systems which have been previously suggested, it has been necessary to provide a memory device, such as a flip-flop stage, for each possible cross-point connection. Since the traffic to be handled in a typical switching system dictates the need for hundreds, if not thousands of cross-points. The necessary stages of flip-flops of other memory devices has been exceedingly large. In addition to the memory devices, additional circuitry is required to address the devices and read out the memory into the cross-points, in order to establish each of the possible links. Since memory devices are expensive, techniques have been utilized for time sharing the devices, such that a single memory can serve many links. One drawback of such time sharing systems is that once a link has been established, information storage as to the location of that link in the matrix is no longer available. In the event that there are faulty cross-points in the matrix, these can not be identified, even though the subscribers report a faulty connection. Accordingly, special maintenance procedures which may amount to computer programs for isolating and testing all available cross-points are sometimes resorted to. It is a feature of this invention to provide counter control of cross-point matrices in a manner such that memory is provided for the links which are established without the need for a separate information element for each cross-point. The link memory is also operative to identify the cross-points which provide the links, thereby simplifying maintenance procedures.

It is generally recognized that digital circuits which are available in integrated circuit form increase the reliability of systems in which they are used. The use of such integrated circuits also facilitates reduction in size of equipment. It is a feature of this invention to provide telephone switching equipment which makes extensive use of such integrated circuit devices. An ancillary feature of the invention is to provide electronic control systems for switching matrix which operates on a binary basis, thereby facilitating the use of digital integrated circuit devices and reducing the wiring necessary to control switching matrices.

The efficiency of a switching system is determined in part by the rapidity with which it can establish a connection to a subscriber requiring service. Both the subscriber requiring service and a free link must be identified in order to establish the transmission path. It has been the general practice to perform these functions independently, thus requiring a first time period to located the subscriber and marking his line. An additional period of time is then required to allocate a free link to the marked line. It is a feature of this invention to provide an electronic control system which both selects a free line and a link corresponding thereto during periods of time which overlap each other, thereby increasing the effective switching speed of the system.

Accordingly, it is an object of the present invention to provide an improved electronic switching system.

It is a further object of the present invention to provide an improved electronic switching system utilizing integrated circuits to provide switching control functions, thereby increasing the reliability and decreasing the size of the system.

It is another object of the present invention to provide an improved digital control system for telephone switching matrices.

It is still another object of the present invention to provide an improved system for controlling switching matrices which also has storage for information respecting the transmission paths established through the matrices.

It is still another object of the present invention to provide an improved electronic switching system where the location of faults, such as noisy cross-points, is readily accomplished.

It is a still further object of the present invention to provide an improved four-wire cross-point matrix switching system.

It is a still further object of the present invention to provide an improved electronic switching system having high switching speed.

Briefly described, an electronic switching system embodying the invention includes a plurality of cross-point matrix strips which are connected in multiple to one end of the system, say the inlets and each of which can provide an individual connection to the other end of the system, say to each of the outlets. Control means for selecting paths through matrix strips includes a separate counter associated with each matrix strip. Logic is provided for transferring a count which may be stored in the counter to its associated matrix strip for operating the cross-point switch having a location in the matrix strip corresponding to the count, such that it provides a connection or link between a selected inlet and an outlet. The system also includes selection logic for advancing the counters at high speed so as to control the counter associated with a free link whereby it will rapidly be advanced to a count corresponding to an inlet requiring connection. The counters provide link memories and contain information as to the allocation of links. Means may be provided for scanning the inlets to detect those requiring connection to the links and transferring information as to their location to the link matrix strip counters so that the proper cross-point switch in the link matrix strip can be operated to rapidly provide a connection to the links.

The invention itself, both as to its organization and method of operation, as well as additional objects and advantages thereof will become more readily apparent from a reading of the following description in connection with the accompanying drawings in which.

Figure 1:
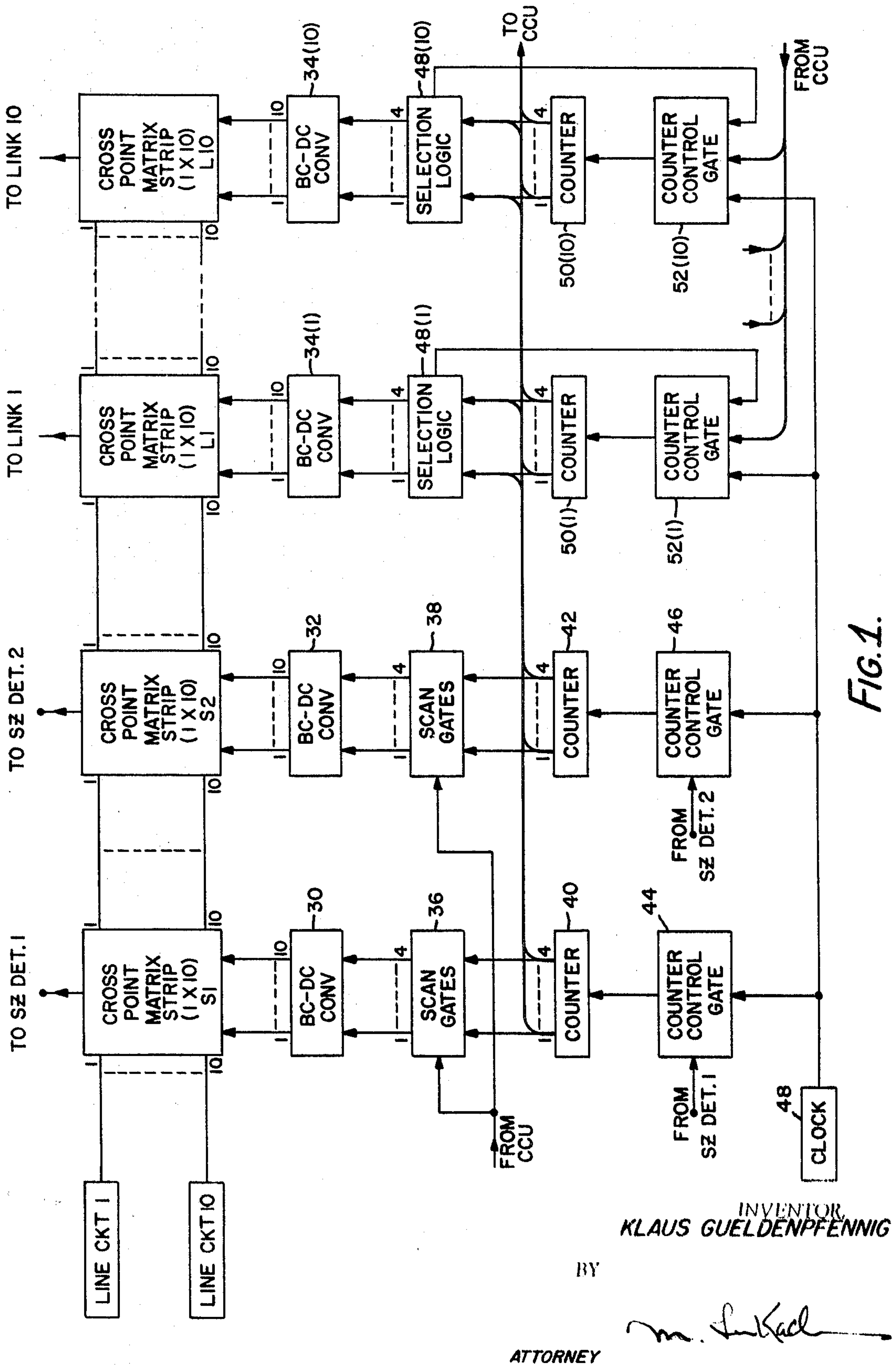
FIG. 1 is a simplified block diagram of an electronic switching system embodying the invention.

The telephone switching system shown in FIG. 1 illustrates a single stage switching system including a plurality of matrix strips connected to form a matrix switch for connection of 10 line circuits to 10 links. Two cross-point matrix strips S1 and S2 are provided for scanning the line circuits so as to detect those requiring service. The other matrix strips L1 through L10 are similar to the matrices S1 and S2 and provide transmission paths between the line circuits and the links. Each of the cross-point matrix strips is similar and is a 1×10 switch. One switching element is provided for each line circuit. This matrix strip is exemplary of any $1 \times n$ matrix strip. The number of bits in the counter or memory which controls the matrix strip (to be described in detail hereinafter) will depend on the magnitude of "$n$." Thus, the cross-point matrix strips L1 through L10 of the stage may be considered to be constituted of 10 layers of switching elements. The arrangement of switching elements may be considered as being such that each switching element corresponds to a separate line circuit. As indicated schematically in the drawing, all of the line circuits are connected in multiple to all of the matrix strips S1, S2 and L1 through L10.

The switching elements themselves may be four-wire cross-point switches, each element having four transistors, two for the send pair and two for the receive pair. A relay with four contacts and a suitable drive circuit may be used. Each switch element, as will be described in greater detail in connection with FIG. 2 may be a module having four transistor cross-points which are triggered simultaneously to operate the switch element and provide a connection from its corresponding line circuit to the link associated with the matrix strip in which the switch element is located. The cross-point matrix strips S1 and S2 are connected to seize detectors which may be frequency responsive devices responsive to AC tones generated by the line circuits when they require services (viz, the subscriber connected thereto goes off hook). Alternatively, if DC signalling is used the seize detectors may be DC detection circuits or relays. A pulse is provided by the seize detectors to the control circuits of their respective scanning matrix strips.

The control circuits for the matrix is an electronic control system which may be constructed from integrated circuits of the type which handle digital signals.

The control system operates on a binary basis. Inasmuch as the cross-point matrix strips are 1 × 10 arrays, a binary-to-decimal conversion is required to selectively operate the individual switch elements of the matrix strips. To this end, a binary code-to-decimal converter is connected to each cross-point matrix strip. The converters translate binary inputs on four input lines into a decimal (1 out of 10) code on any one of 10 output lines. The output lines are connected to the individual switch elements in the matrix strips. The converters are all similar. BC-DC converter 30 is connected to the scanning matrix strip S1. Another similar converter 32 is connected to the matrix strip S2. Similar converters 34(1) to 34(10) are connected to each of the link matrices L1 through L10.

The control system also includes, in the case of the control system for the scanning matrix, scanning gates 36 and 38, binary counters 40 and 42 and counter control gates 44 and 46. Pulses for advancing the counters are obtained from a clock pulse source 48 which may have a relatively high frequency, say 480 kHz. The control system for the scanning matrix strips are similar. It may be desirable for the scanning matrix control system to use a separate clock having a different frequency to accommodate the operating speed of the seize detectors, Two scanning matrix strips are used in order to increase the switching speed of the stage. However, only one scanning matrix strip may be used if faster switching speed can be accommodated.

Each matrix L1 through L10 includes a link selection control which also provides a link memory. This link selection is provided by a selection logic network 48(1) to 48(10). Binary counters 50(1) to 50(10) are also included. The count stored in these counters are transferred through the selection logic to their respective converters for operating selected switch elements in the matrix strips. Different counts in the counters correspond to different switch elements in their associated matrix strips, such that the count stored in the counter provides link memory as to the switch element which is connected to the various links. Counter control gates 52(1) to 52(10), one for each matrix strip L1 to L10, enable the clock pulses from the clock source 48 to be applied to the counters 50. The counters 40 and 42 are connected to the counters 50 in the link selection system. Also, the counters are connected to the common control unit associated with the electronic switching system in order to provide information respecting busy links. In addition, the information as to the switch elements which provide the individual links may be used for fault detection purposes. The counter control gates 52 also receive inputs from the common control unit in order to enable connections to free links, as service is desired from successive subscribers.

In operation, the counter control gates 44 and 46 are normally enabled in the absence of an inhibit level from their associated seize detectors. The clock pulses then continuously advance the counters at high speed. The counters have feedback (viz. the fourth or last flip-flop stage being connected to the first stage), such that they cycle continuously. The scanning gates 34 and 36 transfer the counts to the converters 30 and 32 connected thereto. Each of the gates 36 and 38 has an input from the common control unit. The counter control unit has storage for busy lines. When the count in either the counter 40 or 42 corresponds to a busy line, inhibit pulses are applied to the gates in the scanning gates 36 and 38, such that those counts are inhibited from being transferred from the counters 40 and 42 to the converters 30 and 32.

As successive output pulses on lines 1—10 of the converters (except for those of the 10 converter output lines corresponding to line circuits which are busy) are produced, the switch elements corresponding thereto are operated. Thus, for example, when a pulse is produced on output line 1 from the converter 30, the first switch element which is associated with line circuit 1 is closed. In the event that that line circuit was busy, the inhibit pulses from the common counter unit would preclude the generation of a pulse on output line 1 of the converter 30. This eliminates clicks and other noise in the subscriber circuit connected to line circuit 1. The counters 40 and 42 run synchronously, however, the counts registered in each counter are displaced relative to each other to produce different outputs. Accordingly, pulses generally appear on different output lines of the converters 30 and 32 at the same time. Accordingly, connection may be made more rapidly through the use of the two scanning matrix strips S1 and S2 than would be the case if only one scanning matrix strip were used.

When a line circuit marked as requiring service is connected to an operated switch element. A marking tone, or a mark level, say ground, is applied to one of the seize detectors. Thus, for example, a marking tone on line circuit 1 would be applied through the first switch element when it is operated to seize detector 1. Note that the counter 40 is simultaneously storing a count corresponding to the first switch element in matrix strip S1. The inhibit pulse provided by the seize detector thereupon inhibits the counter control gate 44. Thus, clock pulses are prevented, during the duration of the seize detector pulse, from being applied to the counter 40. The counter then remains at a count corresponding to the operate switch element in matrix strip S1.

The control system operates to transfer this count to one of the counters 50 in the link memories for one of the link matrix strips L1 to L10 which is associated with a free link. A connection is then made through the cross-point switch element in the matrix strip for that free link corresponding in location to the operated cross-point switch element in the matrix strip S1. Consider that link 1 is free, an enable level is then applied from the CCU to the counter control gate 52(1) in the control for matrix strip L1. The clock pulses are then applied through the enabled counter control gate 52(1) so as to advance the counter 50(1). The count in the counter 50(1) is compared with the count stored in the counter 40 in the selection logic 48(1). When the count in the counter 50(1) corresponds to the count in the counter 40, n inhibit level is fed back from the selection logic 48(1) to the counter control gate 52(1), thereby inhibiting the transfer of additional clock pulses to the counter 50(1). The selection logic 48(1) is then operated to transfer the count in the counter 50(1) to the converter 34(1). An output on line 1 of converter 34 is then produced which operates the first cross-point switch element, thereby connecting line circuit 1 to link 1. The next link connection will be made through the next free cross-point matrix strip L2.

The scanning matrix strip S2 is free running while the connection is made through the matrix strip S1 to link 1. The seize detector 2 connected to the scanning matrix strip S2 detects the next line circuit requiring service. The count stored in the counter 42 is then transferred to the counter 50 in the link memory for the next free link and operates the cross-point switch in the next free link matrix strip L2 to L10 to provide the connection to the next free link. Since the seize detection pulse is of duration only long enough to provide for operation of a cross-point switch element, transmission paths may be connected very rapidly. Scanning of line circuits to detect those requiring service can occur during time periods which overlap with the periods of time required to make connections to free links. Accordingly, the switching system is extremely rapid in operation.

Another feature of the system is that the counters provide memory for the cross-point switch elements which are associated with each transmission path. Thus, for example, if parties connected to opposite ends of the path signal the operator that the connection is noisy, the link memories associated with the path (viz. the counter 50 in the stage shown in FIG. 1 or in other stages similar thereto) may be read out or into a printer, thereby providing a record of the cross-point switches in the matrix strips which may be used to maintain the switching system and prevent faults from becoming serious.

Figure 2:
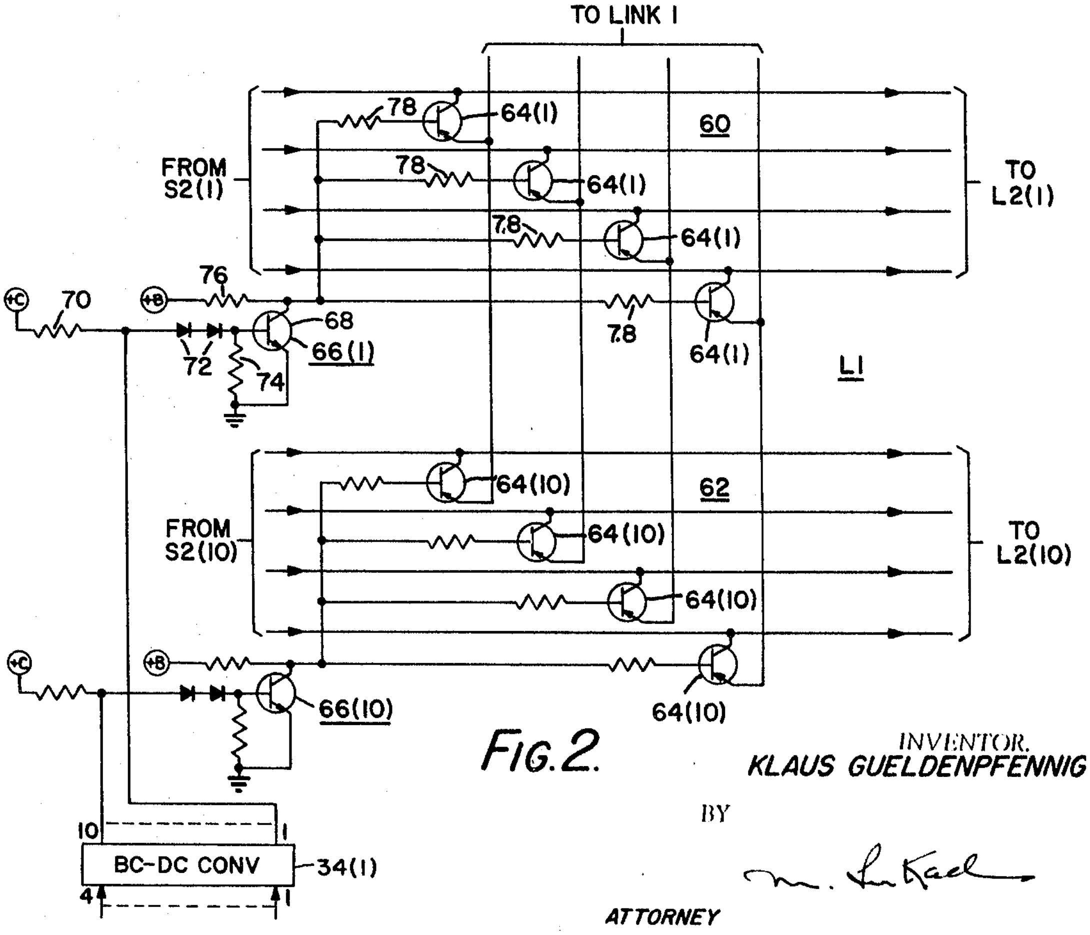
FIG. 2 is a simplified diagram, partially in schematic and partially in block form, of one of the cross-point matrix strips shown in FIG. 1.

The cross-point matrix strip L1 is shown in FIG. 2. Only the first switch element 60 and the 10th switch element 62 are shown to simplify the illustration. Each element constitutes a separate four wire transistor cross-point module, two of these wires provide the send transmission path, while the other two provide the receive transmission path. The horizontal wires are connected in multiple to all of the cross-point matrix strips and then to the line circuits to form a matrix switch. In other words, the four wires for the first switch element 60 are connected on the left to the first switch element in the scanning matrix strip S2 (i.e. S2(1)) and on the right to the first cross-point switch element L2(1) in the next layer link matrix strip L2. The 10th cross-point element similarly has horizontal wires which extend to the 10th cross-point element S2(10) on the left and the 10th cross-point switch element L2(10) on the right. The vertical four wires go to the link and are connected to the horizontal wires when any of the cross-point switch elements is operated.

The cross-point switch elements themselves constitute 10 groups of four transistors 64(1) through 64(10) for each of the 10 switch elements in the matrix strip. These transistors are normally biased off or nonconductive by means of drive circuits 66(1) through 66(10). The circuit 66(1) is typical of the drive circuits and includes a transistor 68 which is biased to cutoff by voltage applied from a source indicated at +C via a bias circuit including a resistor 70, a pair of diodes 72 and another resistor 74. When the transistor 68 of circuit 66(1) is cut off, voltage from a source indicated at +B is applied by way of a resistor 76 and resistors 78 to the bases of the cross-point transistors 64(1), the transistors 64(1) are then cut off. When the drive transistor 68 is rendered conductive by the application of a negative or ground pulse from the first output line of the BC-DC converter 34(1), ground is extended to the bases of the cross-point transistor 64(1), thus rendering them conductive. Accordingly, a transmission path is provided from the horizontal wires to the vertical wires, thereby connecting the line circuit 1 to link 1. Since the counter in the link memory associated with cross-point matrix strip L1 assures that only 1 of the 10 output lines will be actuated during a period that a call is extended over link 1, only one of the cross-point elements 60 through 62 of that link is operated. Other cross-point elements in other links will be operated to extend connections from other line circuits as needed.

Figure 3:
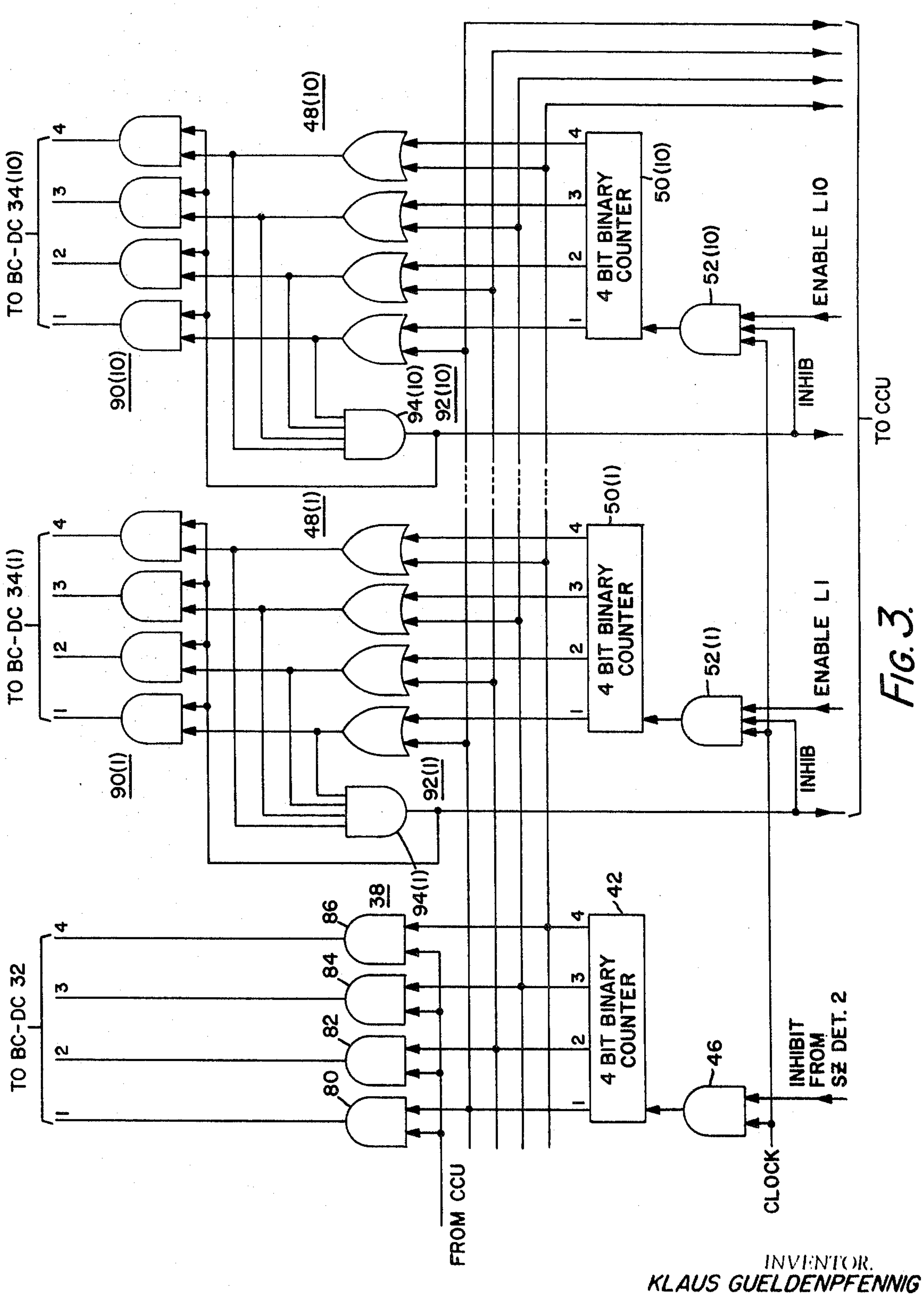
FIG. 3 is a logic diagram of a portion of the matrix control and link selection system of the system shown in FIG. 1.

The link selection means are illustrated in greater detail in FIG. 3. Only the link selection means for the second scanning matrix strip S2 and the first two link matrix strips L1 and L2 are shown in FIG. 3 to simplify the illustration. The control for the second scanning matrix strip includes four AND gates, 80, 82, 84 and 86 which constitute the scan gates 38 (FIG. 1). These gates have inputs from different output lines of the 4-bit binary counter 42 and another input from the common control unit which prevents transfer of a count to the BC-DC converter 32 for matrix strip S2 for counts corresponding to busy line circuits. The transfer of clock pulses to the counter 42 is controlled by an AND gate which constitutes the counter control gate 44. This counter control gate receives an inhibit from the second seize detector. When this input appears, the counter 42 stops and retains the count stored therein.

The selection logic 48(1) for link matrix strip L1 includes two groups of four gates 90(1) and 92(1). The gates 90(1) and AND gates. The gates 92(1) are exclusive OR gates (viz. they provide an output level corresponding to a logical "1" if both input levels are logical "1" or both are logical "0"). The inputs of the AND gates 92(1) are connected to different output lines of the binary counter 42 and each also receives a separate input from a different output line of the 4-bit binary counter 50(1) in the link memory for matrix strip L1. Outputs of the gates 92(1) are each connected to an input of a different one of the AND gates 90(1). Each of the AND gates in the other group 90(1) also receives an input from a comparator AND gate 94(1).

The count to which the binary counter 50(1) may be advanced is controlled by a counter control AND gate 52(1) which is input connected to the clock line and receives an inhibit input from the compare gate 94 in the selection logic SL1. Counting is only permitted when an enable level for link L1 is applied to the counter control gate 52(1).

The selection logic SL10 for the 10th link matrix strip L10 is similar to the selection logic which is used for the first link matrix strip L1. Note also that the wires interconnecting the corresponding output lines of the counters 42 and 50 go to the common control unit which has storage for each connection which is made. The common control unit also insures that enable levels L1 to L10 are applies to the counter control gates 52(1) to 52(10) only when their associated links are free. Thus, once a link is marked busy, it can not again be utilized until it again becomes free.

Consider the case where the first line circuit (line circuit 1) is marked as requiring service and where all of the links are free. Clock pulses are transferred through the counter control gate 46 and advance the 4-bit binary counter 42. When the 4-bit binary counter produces an output level on its first output line that a level is transferred via the gate 80 in the scan gates 38 to the BC-DC converter 32, thereby causing the first cross-point transistors in matrix strip S2 to become conductive. A connection is then extended from Line Circuit 1 to the seize detector 2. The seize detector provides an inhibit output to the control gate 46 stopping the binary counter 42. The inhibit level will be present until the transmission path to the next available link is established.

Assuming all the links are free, let it further be assumed that the enable level L1 is then applied to the counter control gate 52(1). Clock pulses are then transferred via gate 52(1) to the binary counter 50 of the link memory associated with matrix strip L1. When the count to which the counter 50(1) is advanced reaches the count stored in the scanning matrix binary counter 42, each of the gates 92(1) provides an output enabling the compare gate 94. The compare gate 94(1) provides an inhibit level to the input of the control gate 52(1) and an enable level to the AND gates 90. An inverter may be provided at the inhibit input of the control gate 52 so as to effect this inhibit function. Since the flow of clock pulses through the control gate 52 stops, the counter 50 stops and the count stored therein is transferred via the gates 92 and 90 to the BC-DC converter 34(1) for matrix strip L1. It will be recalled that a count of 1 was stored in the binary counter 42. The same count will, of course, be stored in the counter 50. Thus, only the output line 1 from the counter 50 and the output line from the first of the AND gates 90 have a logical "1" level thereon. This level is translated into an output on the first of the 10 lines from the BC-DC converter 34(1). Accordingly, the first cross-point switch element 60 (FIG. 2) will be operated and the connection will be extended therethrough from Line Circuit 1 to link 1.

When the inhibit level from the seize detector 2 disappears, the counter 42 will continue to count until it reaches a count corresponding to the next line circuit which is marked as requiring a service. The next free link matrix strip will then be allotted by application of an enable level to the counter control gate 52 thereof and the switch element in the matrix strip associated with the free link corresponding in position to the line circuit desiring service will be operated. Another connection will then be extended through this last-named link matrix strip.

Figure 4:
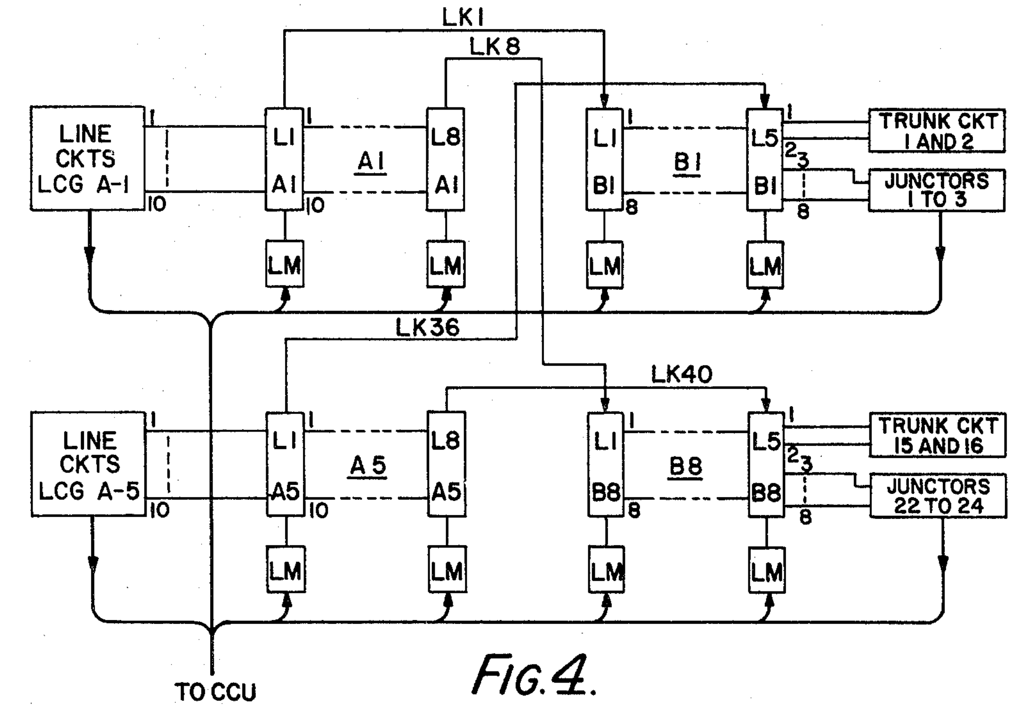
FIG. 4 is a simplified block diagram of an electronic switching system utilizing a multiplicity of switching matrix strips similar to those used in the system of FIG. 1 for providing links between a large number of line circuits and trunk circuits.

The number of link matrix stages and the number of link matrices in each stage will depend upon the traffic which must be handled by the switching system. FIG. 4 illustrates a switching system including two matrix stages which are interconnected to provide transmission paths between 50 line circuits, 16 trunks and 24 junctors or any combination of trunks and junctors. Five groups of line circuits LCGA1 through LCGA5 each having 10 line circuits are connected to five matrices A1—A5. Each of these five matrices includes eight 1×10 cross-point matrix strips L1A1 to L8A1; L1A2 to L8A2,...L1A5 to L8A5.

Eight secondary matrices B1 to B8 are also provided. Each of these stages includes five 1×8 cross-point strips L1B1 to L5B1; L1B2 to L5B2...L1B8 to L5B8. The link memories in the B stages may have only 3-bit counters. Eight different groups of two trunk circuits each are connected to each of the matrices B1 to B8. There are 40 possible links LK1 to LK40 between the primary (A stage), and secondary (b stage) matrices. These links are selected by the common control unit which operates the link memories associated with each matrix strip in each stage. The individual line circuit and trunks in each group which are to be connected are marked and the marking signals are applied to the control unit. The control unit then operates the link memories to select the one of the free links which provides an available path. The junctors provide connection between calling and called line circuits through selected links.

From the foregoing descriptions, it will be apparent that there has been provided an improved telephone switching system which utilizes counters for efficient and rapid path selection. Efficiency and reliability is also enhanced by the facility of the system to utilize integrated circuits of the digital type. Variations and modifications of the herein described systems will undoubtedly suggest themselves to those skilled in the art. Accordingly, the foregoing descriptions should be taken merely as illustrative and not in any limiting sense.

What I claim is:

1. A telephone switching system which comprises:
a. a matrix strip having a plurality of switch elements,
b. matrix strip control means including a counter having storage for a plurality of counts each corresponding to a different one of said switch elements,
c. means operated by said counter for individually operating said switch elements which correspond to the counts stored in said counter, and
d. link selecting means for advancing said counter to selected counts.

2. The invention as set forth in claim 1 including:
a. a plurality of said matrix strips each providing a separate link,
b. a plurality of said counters included in said control means, each of said counters being associated with a different one of said matrix strips,
c. a plurality of said counter operating means each for operating the switch elements of different ones of said matrix strips in accordance with the count stored in the counter associated therewith; and wherein
d. said link selection means includes means for advancing different ones of said counters whereby to select the link provided by the matrix strip associated therewith.

3. The invention as set forth in claim 2 further comprising a plurality of inlets to said system connected in multiple to each of said matrix strips, each inlet corresponding to elements in different ones of said matrix strips which correspond to a like count, and means included in said link selection means for selectively connecting different inlets to different links operative to advance the counters associated to switch elements which correspond to said inlets.

4. The invention as set forth in claim 3 wherein said means included in said link scanning means includes another counter associated with said inlets, means for advancing said other counter to counts corresponding to inlets to be connected to said links, and means for selectively transferring said counts stored in said other counter to said counter associated with said matrices.

5. An electronic switching system which comprises:
a.. a plurality of switching matrix strips each including a plurality of switch elements for connecting any one of a multiplicity of different lines to any one of a plurality of links, and
b. pluralities of link memories each including a binary counter connected to a different one of said matrix strips for operating selected elements thereof.

6. The invention as set forth in claim 5 wherein said matrix strips are arranged in:
a. a first matrix stage including a plurality of groups of said matrix strips, each connected in multiple to a different group of inlet lines,
b. a second matrix stage including a plurality of groups of matrix strips different in number than said first group, each group of said second group of matrix strips being connected in multiple to a different group of outlet lines,
c. a plurality of links connected between different matrix strips in said first group and different matrix strips in said second groups, and wherein
d. means are provided for advancing different counters in said link memories for connecting said inlet and outlet lines via different ones of said links.

7. A switching system for connecting input lines to links which comprises:
a. a plurality of cross-point link matrix strips each having an outlet for connection to a different one of said links and a plurality of input each for connection to a different one of said lines,
b. a plurality of counters which provide memory for each of said links,
c. link selection means for controlling said counters and for selecting different ones of said link matrix strips, and
d. cross-point selection logic circuit for transferring the count stored in each of said counter to the matrix strip associated therewith for operating cross-points therein corresponding to different ones of said line whereby to connect said lines to different ones of said links.

8. The invention as set forth in claim 7 including a scanning cross-point matrix strip connected between said lines and said link matrices, a counter associated with said scanning matrix strip, means including said counter and said scanning matrix strip for scanning said line to detect any one thereof which is marked for connection to said links, means for controlling said scanning matrix strip counter so that it stores a count corresponding to said line which is to be connected to said links, and means included in said selection logic for said link matrix strips for transferring the count in said scanning matrix strip counter to selected ones of said link counters.

9. The invention as set forth in claim 7 wherein all said counters are binary counters, and including a plurality of code conversion means connected between said counters and their corresponding link matrix strips for translating the binary coded count in said counter into an output for operating the cross-point is said link matrix strips corresponding to said binary count.

10. The invention as set forth in claim 9 wherein said cross-point matrix strips each includes 10 cross-point switch elements and wherein said code conversion means is a binary code-to-decimal code converter.

11. The invention as set forth in claim 7 wherein each of said selection logic includes a source of clock signals, a plurality of control gates input coupled to said source out to different ones of said counters for inhibiting the application of clock pulses to said counters, and means transferring the counts stored therein to said matrix strips.

12. The invention as set forth in claim 11 including a means for selectively enabling different ones of said counter control gates when the link associated therewith is free.

13. The invention as set forth in claim 8 wherein said scanning matrix strip includes a plurality of cross-point switches each for providing a connection from a different one of said lines to a seize detector input, a counter control gate, a source of clock pulses connected to said counter control gate for applying said clock pulses through said gate to said scanning matrix strip counter, and means for inhibiting said counter control gate in response to a seize detection signal from said scanning matrix associated therewith.

14. The invention as set forth in claim 13 including a plurality of scan gates for transferring the output of said scanning matrix strip counter to said scanning matrix strip, and means for inhibiting said scan gates when said counter stores a count corresponding to a busy line.

15. The invention as set forth in claim 14 including a code converter connected between said scanning matrix strip counter and the individual point switch elements of said scanning matrix strip for translating binary codes in said scanning matrix strip counter into codes for sequentially operating different ones of the cross-point switch elements in said scanning matrix strip.

16. The invention as set forth in claim 7 including a pair of scanning matrix strips connected in tandem between said lines and said link matrix strips, a separate scanning matrix strip counter associated with each of said scanning matrix strips, and means for applying clock pulses to said scanning matrix strip counters simultaneously so that said counters produce different counts that are displaced with respect to each other, means for transferring the counts in said counters to their respective scanning matrix strips for successively operating different cross-point switch elements therein, and means responsive to the transmission of a signal through an operated one of said cross-point switch elements indicative of a line marked as desiring service for stopping the application of said pulses one of said scanning counters associated with one of said scanning matrix strips which detects said marked line.